United States Patent [19]

Inaba et al.

[11] Patent Number: 4,849,766
[45] Date of Patent: Jul. 18, 1989

[54] VEHICLE WINDOW GLASS ANTENNA USING TRANSPARENT CONDUCTIVE FILM

[75] Inventors: Hiroshi Inaba; Masao Shinnai; Kazuya Nishikawa; Tamotsu Saitoh; Tokio Tsukada, all of Matsusaka, Japan

[73] Assignee: Central Glass Company, Limited, Ube, Japan

[21] Appl. No.: 69,392

[22] Filed: Jul. 2, 1987

[30] Foreign Application Priority Data

Jul. 4, 1986 [JP] Japan ............................ 61-155938
Aug. 4, 1986 [JP] Japan ............................ 61-181993

[51] Int. Cl.⁴ ............................................ H01Q 1/32
[52] U.S. Cl. ........................................................ 343/713
[58] Field of Search ................ 343/713, 704; 219/203, 219/522

[56] References Cited

U.S. PATENT DOCUMENTS 2,944,926  7/1960  Gaiser ................................ 343/704
3,728,732  4/1973  Igarashi ............................ 343/713
3,766,563 10/1973  Sauer et al. ...................... 343/713
3,771,159 11/1973  Kawaguchi et al. ............... 343/713
4,329,691  5/1982  Prewitt ............................. 343/713

FOREIGN PATENT DOCUMENTS 0155647  9/1985  European Pat. Off. ............ 343/713
 730131 12/1942  Fed. Rep. of Germany ...... 343/704
 491562  1/1974  Japan .
  15403  1/1986  Japan .
 171202  8/1986  Japan .

Primary Examiner—Rolf Hille
Assistant Examiner—Michael C. Wimer
Attorney, Agent, or Firm—Fleit, Jacobson, Cohn, Price, Holman & Stern

[57] ABSTRACT

The invention relates to a receiving antenna disposed on or in a vehicle window glass such as the rear window glass or the windshield of an automobile. The antenna comprises, as a principal antenna element, a transparent and conductive film in the shape of a quadrilateral having two substantially parallel sides one of which is at a distance of 15–25 mm from the upper edge of the window glass and the other at a distance of 15–25 mm from the lower edge. The quadrilateral film may be so wide that the remaining two sides thereof extend along the two side edges of the window glass, respectively, at a distance of 15–25 mm from the respective side edges. This is suitable for reception of not only FM radio broadcast waves in the 76–90 MHz or 88–108 MHz band and TV broadcast waves in the 90–222 MHz band but also AM radio broadcast waves. When the antenna is mostly for reception of FM radio broadcast waves and/or TV broadcast waves, it is suitable that the transparent and conductive film is in the shape of a rectangle which is elongate in the direction substantially perpendicular to the upper and lower edges of the window glass and has a lateral width in the range from 50 to 250 mm.

12 Claims, 5 Drawing Sheets

VEHICLE WINDOW GLASS ANTENNA USING TRANSPARENT CONDUCTIVE FILM

BACKGROUND OF THE INVENTION

This invention relates to a vehicle window glass antenna for receiving broadcast waves, which uses a transparent and conductive film coated on the window glass pane or interposed between two sheets of glass that constitute a laminated glass.

It is known to provide the rear window glass of an automobile with a so-called window glass antenna which is made up of conductive strips disposed on the glass surface in a suitable pattern. However, it is difficult to acquire sufficiently high gains in receiving AM and FM radio broadcast waves and television broadcast waves by such a window glass antenna because the antenna has to be formed within a very narrow area left above or below an array of defogging heater strips usually provided to the rear window glass.

Also it has been proposed to provide the windshield of an automobile with a transparent and conductive film to use it as an antenna of reception of broadcast waves. Thus far, however, vehicle window glass antennas of this type have not exhibited sufficiently high gains in receiving both radio broadcast waves and television broadcast waves.

SUMMARY OF THE INVENTION

It is an object of the present invention to provide a vehicle window glass antenna which is of the type using a transparent and conductive film and which is practicable as a broadband antenna to receive not only AM and FM radio broadcast waves but also television broadcast waves, and which is applicable to either the windshield or the rear window glass of an automobile.

According to the invention there is provided a vehicle window glass antenna, comprising as a principal element of the antenna a transparent and electrically conductive film which is attached to a window glass for the vehicle and is in the shape of a quadrilateral comprising two substantially parallel sides one of which is at a distance of 15–25 mm from the upper edge of the window glass and the other at a distance of 15–25 mm from the lower edge of the window glass.

The transparent and conductive film may be coated on the surface of a glass sheet, which is used by itself as a window glass pane or is laminated with another glass sheet by using an adhesive plastic interlayer, or may be interposed together with adhesive plastic interlayers between two glass sheets that constitute a laminated glass.

The transparent film antenna according to the invention has a quadrilateral shape and is at a relatively short distance, as defined above, from each of the upper and lower edges of the window glass pane. By the employment of such arrangement, antenna gains in receiving FM radio broadcast waves and TV broadcast waves become high probably because the antenna can efficiently pick up a high-frequency current produced in the vehicle body by the incoming wave besides the high-frequency current acquired by direct reception of the incoming wave by the antenna itself.

When it is intended to use an antenna according to the invention as a broadband antenna to receive not only FM radio broadcast waves and TV broadcast waves but also AM radio broadcast waves, it is suitable to form the transparent and conductive film over nearly the entire area of the window glass such that two sides of the quadrilateral film extend generally along the two side edges of the window glass, respectively, at a distance of 15–25 mm from the respective side edges of the window glass.

When it is desired to maximize antenna gains in receiving FM radio broadcast waves and TV broadcast waves, it is suitable to form the transparent and conductive film into the shape of a rectangle which is elongate in the direction substantially perpendicular to the upper and lower edges of the window glass and has a lateral width in the range from 50 to 250 mm. This is based on the fact that a vertical antenna pattern formed of a high-conductivity metal such as copper wire exhibits high gains, and the lateral width of the rectangular film antenna is specified so as not to be very small with consideration of very higher resistivity of the transparent and conductive film than copper wire and the like.

The transparent and conductive film used in this invention may be either a single-layer film of, for example, indium-tin-oxide (ITO), indium trioxide or tin dioxide or a multilayer film which has heat-reflecting ability too and comprises, for example, Ag and $TiO_2$, Ag and ZnO, or either $BiO_2$ or $TiO_2$ and Au, Ag or Cu. Since any of such conductive films are high in visible light transmittance, the present invention is applicable to either the rear window glass or the windshield of an automobile. For the efficiency of the antenna it is favorable to utilize the windshield which is usually larger in surface area than the rear window.

A window glass antenna according to the invention is very suitable for application to automobiles, and this antenna exhibits sufficiently high average gain in any of the 76–90 MHz band used in Japan for FM radio broadcasting, 88–108 MHz band used in many other countries for FM radio broadcasting and 90–222 MHz band used for TV broadcasting. Also it is practicable to receive AM radio broadcast waves by an antenna according to the invention.

In simplicity of construction and also in reliability the film antenna according to the invention is advantageous over conventional vehicle window glass antennas using conductive strips to form an antenna pattern. In the conventional antennas applied to automobiles it is necessary to change the number and arrangement of the conductive strips for the sake of tuning according to the car types. In the antenna according to the invention there is little need for such tuning, and there is no possibility of break of antenna pattern.

It is possible to afford heat-reflecting ability to a film antenna according to the invention, as mentioned hereinbefore. Besides, it is possible to use an antenna according to the invention also as a defogging heater element. When the window glass is a laminated glass it is possible to provide an antenna according to the invention and conventional defogging heater strips in the same area of the window glass.

DESCRIPTION OF THE PREFERRED EMBODIMENTS

Figure 1:
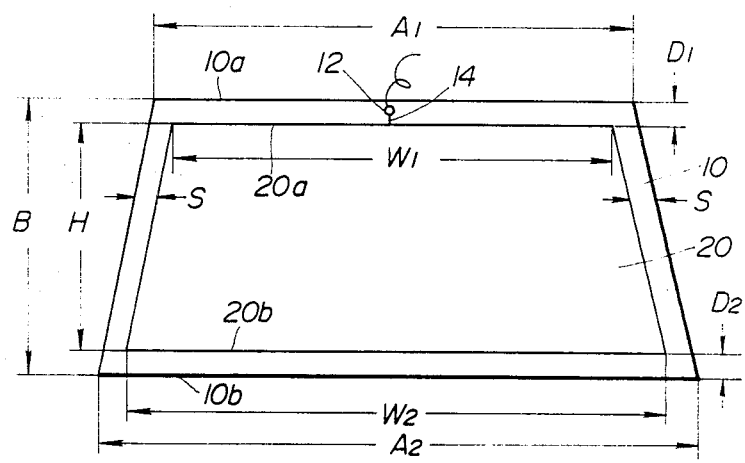
FIG. 1 is a plan view of an automobile window glass provided with a transparent film antenna as a first embodiment of the invention.

FIG. 1 shows an automobile windshield provided with an antenna 20 embodying the present invention. The antenna 20 is a transparent conductive film coated on the inboard surface of the glass pane 10. In this example the coating film 20 which serves as an antenna is formed by depositing ITO on the glass surface by a physical technique such as sputtering or vacuum deposition. The transparent film antenna 20 has a trapezoidal shape nearly similar to the shape of the glass pane 10 and covers almost the entire surface area of the glass pane 10, but the film antenna 20 is clearly spaced from every edge of the glass pane 10. According to the invention, both the distance $D_1$ of the upper edge 20a of the antenna 20 from the upper edge 10a of the glass pane 10 and the distance $D_2$ of the lower edge 20b of the antenna from the lower edge 10b of the glass pane are within the range from 15 to 25 mm, though $D_1$ and $D_2$ are not necessarily equal. The distance S of each side edge of the antenna 20 from the nearby side edge of the glass pane is also from 15 to 25 mm. The antenna 20 is connected to a feed point 12 by a short conductor line or lead 14. It should be clear from FIG. 1 that feed point 12 is disposed on the window glass in a middle region of a horizontally elongate area between upper edge 10a of the glass pane 10 and the upper edge 20a of film antenna 20.

In a sample of the window glass of FIG. 1 the glass pane 10 was 1120 mm in width $A_1$, 1480 mm in width $A_2$ and 504 mm in length B, and the antenna 20 was 1080 mm in with $W_1$, 1444 mm in width $W_2$ and 464 mm in length H. The distances $D_1$ and $D_2$ of the antenna 20 from the upper and lower edges of the glass pane 10 were each 20 mm.

Gains of this sample antenna in receiving FM radio broadcast waves and TV broadcast waves were measured and compared with gains of a standard 1.5 m long dipole antenna. That is, for any frequency the gain of the dipole antenna was taken as the basis, 0 dB, and the gain of the sample antenna was marked on this basis. As the result, gain of the sample antenna was −12.7 dB on an average in the Japanese domestic FM radio broadcasting band of 76–90 MHz, −15.9 dB on an average in the foreign FM radio broadcasting band of 88–108 MHz and −19.5 dB on an average in the 90–222 MHz TV broadcasting band. For comparison, by the same testing a superior example of conventional window glass antennas comprised of conductive strips patterned on the glass pane exhibited average gains (vs. the dipole antenna) of −20.1 dB in the 76–90 MHz band, −23.2 dB in the 88–108 MHz band and −20.6 dB in the 90–222 MHz band. Therefore, it is understood that the window glass antenna of FIG. 1 is considerably improved in efficiency over a fairly broad band.

On the same sample antenna of FIG. 1, gains in receiving AM radio broadcast waves were measured and compared with gains of an 1 m long whip antenna on the rear part of the automobile. That is, for each frequency the gain of the whip antenna was taken as the basis, 0 dB. As the result, gain of the sample antenna was −10.3 dB on an average in the AM broadcasting band of 535–1605 KHz. In the case of the aforementioned example of conventional window glass antennas the average gain (vs. the whip antenna) was −10.5 dB. Accordingly the antenna of FIG. 1 is judged to be of practical use for receiving AM broadcast waves too.

Figure 2:
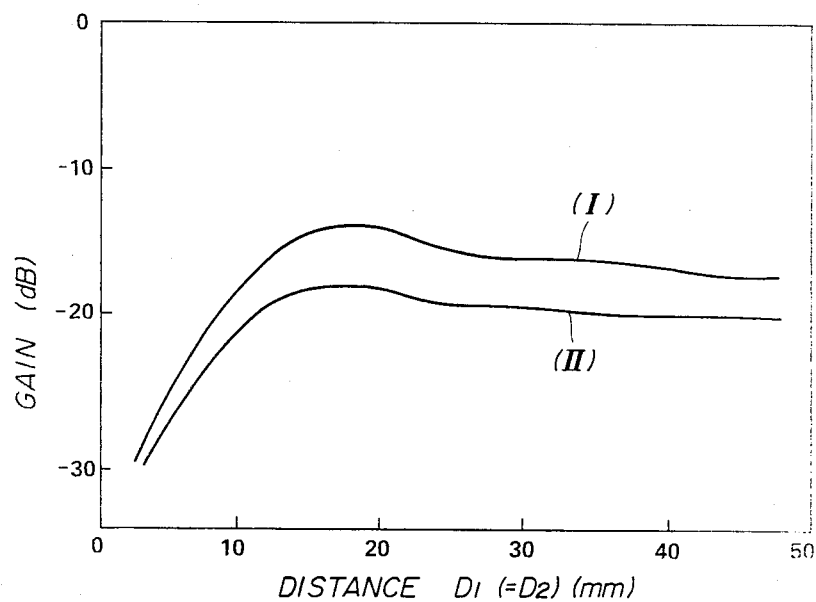
FIG. 2 is a graph showing the relationship between the distance of the antenna in FIG. 1 from the upper and lower edges of the window glass pane and average gain of the antenna in receiving FM radio broadcast waves or TV broadcast waves.

With respect to the transparent film antenna 20 of FIG. 1, an experiment was conducted to clarify the relationship between the distances $D_1$ and $D_2$ of the antenna 20 from the upper and lower edges of the glass pane 10 and receiving gains of the antenna. The results are shown in FIG. 2, wherein the curve (I) represents average gain in receiving FM radio broadcast waves ranging from 76 to 108 MHz and the curve (II) average gain in receiving TV broadcast waves ranging from 90 to 222 MHz. In each case, the gain of the standard dipole antenna was taken as the basis, 0 dB. In FIG. 2 it is clearly seen that the receiving gain becomes maximal for both FM radio broadcast waves and TV broadcast waves when the distances $D_1$ and $D_2$ are in the range from 15 to 25 mm.

Figure 3:
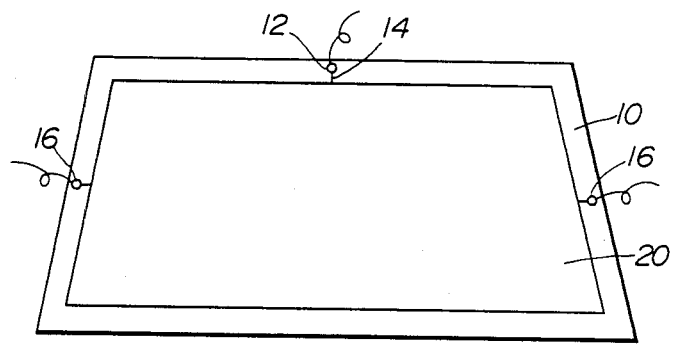
FIG. 3 shows using the transparent film antenna of FIG. 1 also as a defogging heater element.

Referring to FIG. 3, the transparent film antenna 20 of FIG. 1 can be used also as a defogging heater element. For such purpose the antenna 20 is connected to a pair of terminals 16 which are provided on the glass pane 10 to apply a DC voltage available on the car, such as a voltage of 12 V, across the opposite edges of the antenna or conductive film 20. The principal function of the antenna 20 is not lost by application of such a heating voltage thereto, though there occurs some decrease in antenna gain.

Figure 4:
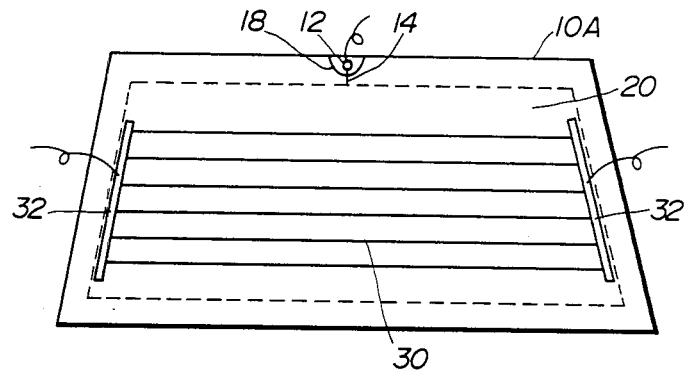
FIG. 4 is a plan view of an automobile window glass provided with a transparent film antenna according to the invention and an array of defogging heater strips.
Figure 5:
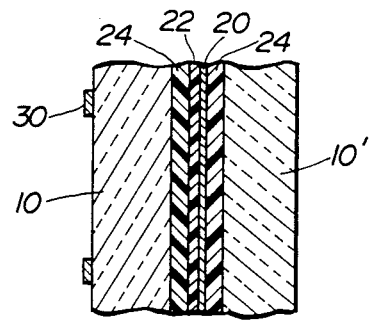
FIG. 5 is a fragmentary and explanatorily sectional view of the window glass of FIG. 4.

FIGS. 4 and 5 show an automobile rear window glass which is provided with a transparent film antenna 20 according to the invention and an array of defogging heater strips 30. The glass pane 10A is a laminated glass, and the film antenna 20 is interposed between two glass sheets 10 and 10′ used in the laminated glass. The heater strips 30 are formed on the inboard surface of the glass pane 10A by baking a conductive paste printed on the glass surface. A pair of bus bars 32 for the heater strips 30 are formed on the same glass surface by the same technique. In this case the transparent and conductive film 20 used as the antenna is a multilayer film which comprises a Ag layer and a $TiO_2$ layer and is deposited on a polyester film 22. The polyester film 22 supporting thereon the conductive film 20 and interlayers 24 of polyvinyl butyral or an alternative plastic are assembled as a sandwich under slight pressure, and the resultant laminate is sufficiently pressed under heating to accomplish uniting. The feed point 12 is provided by using a small cut 18 in the glass sheet 10, and the lead 14 is formed by elongately extending the conductive film 20 or by using a piece of a metal foil such as a copper foil which is partly inserted between the conductive film 20 and the adjacent interlayer 24.

In shape and size the antenna 20 of FIGS. 4 and 5 is generally similar to the embodiment shown in FIG. 1, and this antenna 20 embedded in the pane 10A of laminated glass is equivalent in receiving gains to the antenna 20 of FIG. 1 on the glass pane surface.

Figure 6:
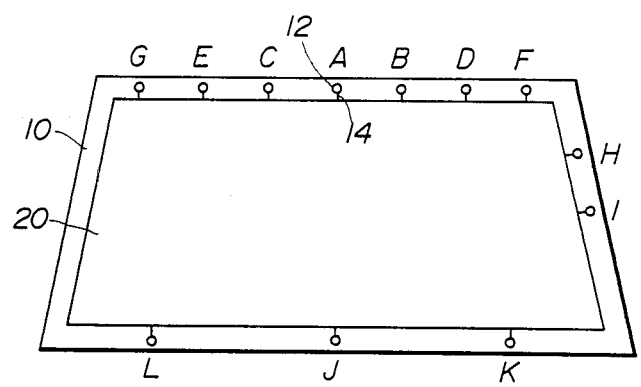
FIG. 6 shows various positions of the feed point for the antenna of FIG. 1 employed in an experiment to clarify the effect of changing the position of the feed point on the efficiency of the antenna.

With respect to the antenna 20 in the shape shown in FIGS. 1 and 4, the position of the feed point 12 slightly affects gains of the antenna. Using the aforementioned sample of the antenna 20 of FIG. 1 an experiment was conducted by variously changing the position of the feed point 12 as indicated in FIG. 6 at points A to L. At each position of the feed point 12, gains of the antenna 20 for FM radio broadcast waves ranging from 76 to 108 MHz and for TV broadcast waves ranging from 90 to 222 MHz were measured, and at any frequency the gain measured with the feed point 12 in the position A was taken as the basis, 0 dB. The result is shown in Table 1, wherein each gain value is an average in the FM or TV broadcasting band.

TABLE 1

| Position of Feed Point | Gain (dB) FM Band (76-108 MHz) | TV Band (90-222 MHz) |
| --- | --- | --- |
| A | 0 | 0 |
| B | 0 | −2.1 |
| C | −1.0 | −1.9 |
| D | −2.1 | −3.1 |
| E | −3.6 | −0.3 |
| F | −2.0 | −2.2 |
| G | −1.9 | −2.1 |
| H | −4.2 | −3.5 |
| I | −7.3 | −5.0 |
| J | −4.9 | −1.6 |
| K | −5.2 | −4.4 |
| L | −6.2 | −4.8 |

As indicated by the experimental data in Table 1, it is best to position the feed point 12 in the middle region of the horizontally elongate area between edge 20a and the upper edge of the glass pane 10, and the second best positions are other points along the upper edge of the glass pane and the middle point of the area along the lower edge of the glass pane.

Figure 7:
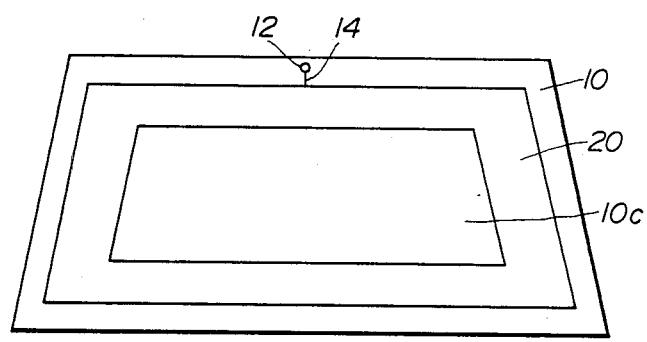
FIG. 7 shows a modification of the shape of the film antenna of FIG. 1.

FIG. 7 shows a differently shaped film antenna 20 according to the invention. This antenna 20 can be regarded as using only a peripheral portion of the trapezoidal antenna 20 of FIG. 1. In other words, coating with the film antenna 20 is omitted in a central area 10c of the glass pane 10. The antenna 20 of FIG. 7 is nearly equivalent in gains to the antenna of FIG. 1 having a larger surface area.

Figure 8:
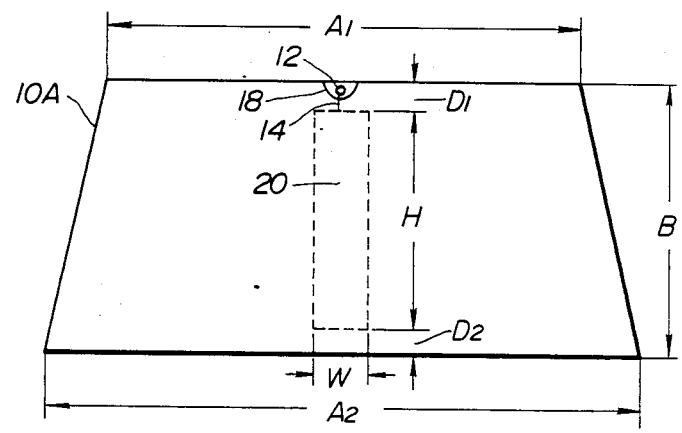
FIG. 8 is a plan view of an automobile window glass provided with a transparent film antenna as another embodiment of the invention.

FIG. 8 shows an automobile windshield provided with a transparent film antenna 20 as another embodiment of the invention. The glass pane 10A is a laminated glass using two sheets of glass, and the film antenna 20 is interposed between the two glass sheets in the manner as illustrated in FIG. 5.

In this embodiment the transparent and conductive film 20 to serve as the antenna was formed by depositing ITO on the polyester film 22 shown in FIG. 5, and the lateral width of the film or antenna 20 is made far smaller than the width of the glass pane 10A. That is, the film antenna 20 of FIG. 8 has a rectangular shape, is elongate in the direction perpendicular to the upper and lower edges of the glass pane 10A and is located in the center of the glass pane 10A. Also in this case the distances $D_1$ and $D_2$ of the antenna 20 from the upper and lower edges of the glass pane 10 are within the range from 15 to 25 mm.

In a sample of the windshield of FIG. 8 the glass pane 10A was 1200 mm in width $A_1$, 1500 mm in width $A_2$ and 710 mm in length B, and the antenna 20 was 150 mm in width W and 660 mm in length H. The distances $D_1$ and $D_2$ of the antenna 20 from the upper and lower edges of the glass pane 10A were each 25 mm. Gains of this sample antenna in receiving FM radio broadcast waves and TV broadcast waves were measured and compared with gains of a 1.5 m long dipole antenna by taking the gain of the dipole antenna for any frequency as 0 dB. As the result, gain of the sample antenna was −16.9 dB on an average in the Japanese domestic FM radio broadcasting band of 76–90 MHz, −17.0 dB on an average in the foreign FM radio broadcasting band of 88–108 MHz and −18.7 dB on an average in the 90–222 MHz TV broadcasting band. For comparison, by the same testing a 1 m long whip antenna exhibited average gains (vs. the dipole antenna) of −16.1 dB in the 76–90 MHz band, −21.1 dB in the 88–108 MHz band and −22.0 dB in the 90–222 MHz band. Accordingly the antenna 20 of FIG. 8 is judged to be equivalent to or better than the whip antenna in efficiency.

In the case of the above described rectangular and elongate antenna 20 it is suitable to form the antenna 20 in a central area of the glass pane as shown in FIG. 8, though it is also possible to shift the location of the same antenna leftwards or rightwards. Also it is possible to form an antenna corresponding to and equivalent to the rectangular antenna 20 of FIG. 8 by depositing a transparent and conductive film on the surface of the glass pane.

Figure 9:
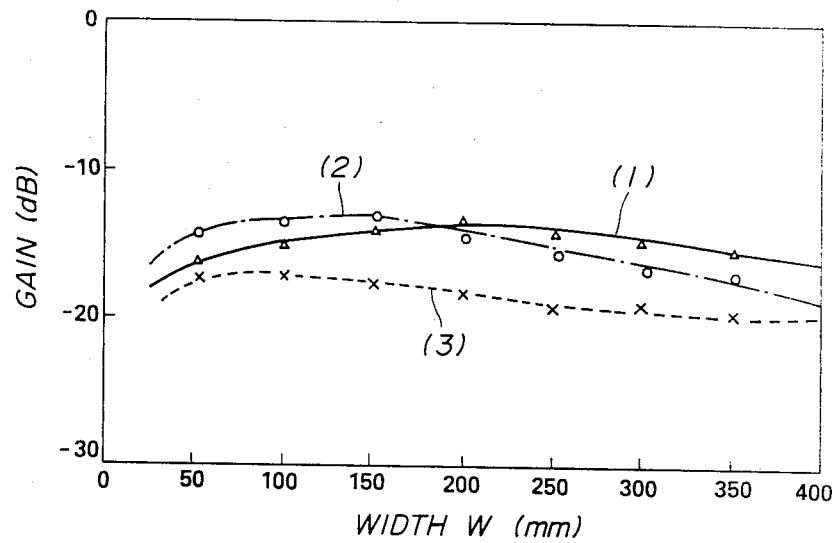
FIG. 9 is a graph showing the relationship between the lateral width of the antenna in FIG. 8 and average gain of the antenna in receiving FM radio broadcast waves or TV broadcast waves.

With respect to the antenna 20 in the shape and arrangement shown in FIG. 8, an experiment was conducted to clarify the relationship between the lateral width W of the antenna 20 and receiving gains of the antenna 20. The results are shown in FIG. 9, wherein the curve (1) represents average gain in receiving the domestic FM radio broadcast waves ranging from 76 to 90 MHz, the curve (2) average gain in receiving foreign FM radio broadcast waves ranging from 88 to 108 MHz and the curve (3) average gain in receiving TV broadcast waves ranging from 90 to 222 MHz. In each case the gain of the standard dipole antenna was taken as the basis, 0 dB. In FIG. 9 it is seen that the receiving gain becomes maximal for not only the domestic and foreign FM radio broadcast waves but also TV broadcast waves when the lateral width W of the rectangular antenna 20 in FIG. 8 is in the range from 50 to 250 mm.

The length H of the rectangular and elongate antenna 20 shown in FIG. 8 is almost determined by the requirement that the distances $D_1$ and $D_2$ of the antenna from the upper and lower edges of the glass pane should be in the range from 15 to 25 mm. On condition that this requirement is met, this antenna exhibits maximal gains when the length (B) of the window glass pane is such that the length H of the antenna falls in the range of resonance length for the frequency of 90 MHz, $(\lambda 4)\alpha \pm (\lambda/20)\alpha$, wherein $\lambda$ is the wavelength and $\alpha$ is the wavelength shortening coefficient of the window glass antenna (usually α is about 0.6), viz. in the range from 400 to 600 mm. Since the frequency of 90 MHz is in both the Japanese domestic FM radio broadcasting band and the foreign FM radio broadcasting band and also in the frequency band of TV broadcast waves for the lower channels (90-108 MHz), the aforementioned range overlaps the range of resonance for broadcast waves in these bands. With respect to TV broadcast waves for the higher channels (170-222 MHz), the range of half-wave resonance length for the middle frequency of 195 MHz, $(\lambda/2)\alpha \pm (\lambda/20)\alpha$, is contained in the aforementioned range of resonance length at 90 MHz. These are probable reasons for maximal gains of the antenna 400 to 600 mm in length.

Figure 10:
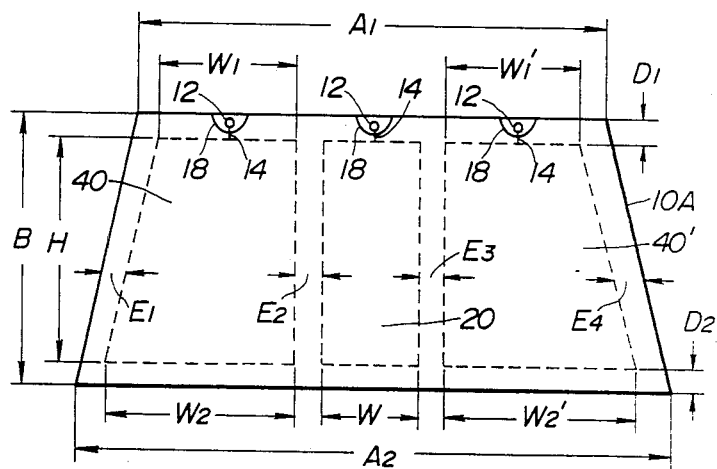
FIG. 10 shows addition of supplementary transparent film antennas to the film antenna of FIG. 8.

In FIG. 10, the rectangular and elongate antenna 20 of FIG. 8 is supplemented by an auxiliary antenna 40 on the lefthand side and another auxiliary antenna 40' on the righthand side. Each of these auxiliary antennas 40 and 40' is a transparent and conductive film formed and interposed between the two glass sheets in the same manner as the primary rectangular antenna 20. A feed point 12 is provided to each of these three film antennas 20, 40 and 40' so that each antenna can be used independently.

In a sample of the windshield of FIG. 10 the glass pane 10A was 1200 mm in width $A_1$, 1500 mm in width $A_2$ and 710 mm in length B, and the dimensions of and relating to the rectangular antenna 20 and the auxiliary antennas 40, 40' were as follows. W=250 mm, H=660 mm, $D_1=D_2=25$ mm, $W_1=W_1'=380$ mm, $W_2=W_2'=500$ mm, $E_1=E_2=E_3=E_4=50$ mm. Gains of each antenna 20, 40 or 40' in this sample in receiving FM broadcast waves and TV broadcast waves were measured and compared with ains of the standard dipole antenna by taking the gain of the dipole antenna for any frequency as 0 dB. The results are shown in Table 2.

TABLE 2

|  | Average Gain (dB) | | |
| --- | --- | --- | --- |
|  | Rectangular Center Antenna (20) | Auxiliary Antenna (40) | Auxiliary Antenna (40') |
| Domestic FM Band (76-90 MHz) | −18.0 | −18.5 | −20.3 |
| Foreign FM Band (88-108 MHz) | −17.5 | −17.6 | −18.0 |
| VHF TV Band (90-222 MHz) | −21.6 | −22.9 | −24.0 |

In Table 2 it is seen that each of the auxiliary antennas 40, 40' is only slightly lower in efficiency than the rectangular center antenna 20. This means that each of the auxiliary antennas 40, 40' can be used as an independent antenna. Accordingly it is possible to use the three antennas 20, 40 and 40' in FIG. 10 in combination as a set of deversity antenna in which receiving gains of the three antenna elements 20, 40, 40' are continually compared with each other for switchover of the active antenna element to the most efficient one at a very short time interval such as 1/4000 sec.

The rectangular and elongate antenna 20 does not always exhibit sufficiently high gains in receiving AM radio broadcast waves, but this is compensated by using the auxiliary antennas 40, 40' together with the antenna 20. When the antennas 20, 40, 40' in the aforementioned sample were used in this manner an average gain in the 535–1605 KHz frequency band was −6.3 dB, taking the gain of a 1 m long whip antenna as 0 dB. This test result indicates practicability of the combination of the antennas 20, 40 and 40' for reception of AM broadcast waves in view of the already described fact that in the case of a superior example of conventional window glass antennas the average gain (vs. the whip antenna) in the same frequency band was −10.5 dB.

Figure 11:
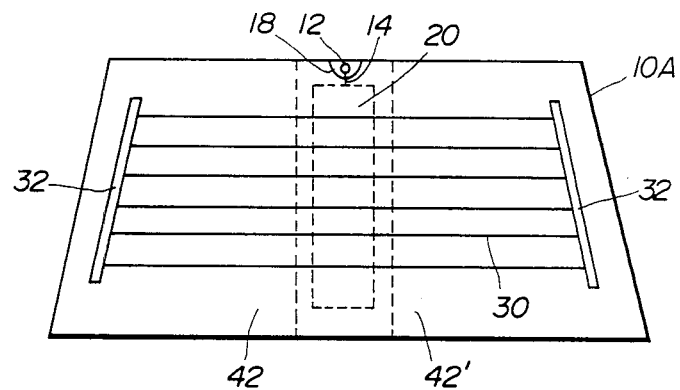
FIG. 11 shows an automobile window glass provided with heat-reflecting films and an array of defogging heater strips in addition to the transparent film antenna of FIG. 8.

FIG. 11 shows an automobile rear window glass provided with a transparent film antenna 20 having a rectangular shape similarly to the antenna 20 in FIG. 8. The glass pane 10A is a laminated glass, and the film antenna 20 is interposed between the two glass sheets in the manner as illustrated in FIG. 5. In this case the transparent film 20 used as the antenna is a multilayer film which comprises a Ag layer and a $TiO_2$ layer and is deposited on the polyester film 22 shown in FIG. 5. In relatively wide areas on the lefthand and righthand sides of the antenna 20 the same multilayer film is interposed between the two glass sheets (in a strict sense between the two interlayers 24 shown in FIG. 5) to serve as transparent heat-reflecting films 42 and 42'. Furthermore, an array of defogging heater strips 30 and a pair of bus bars 32 are formed on the inboard surface of the glass pane 10A by baking a conductive paste printed onto the glass surface. The efficiency of the rectangular film antenna 20 is scarcely affected by the addition of the heat-reflecting films 42, 42' and the heater strips 30.

Figure 12:
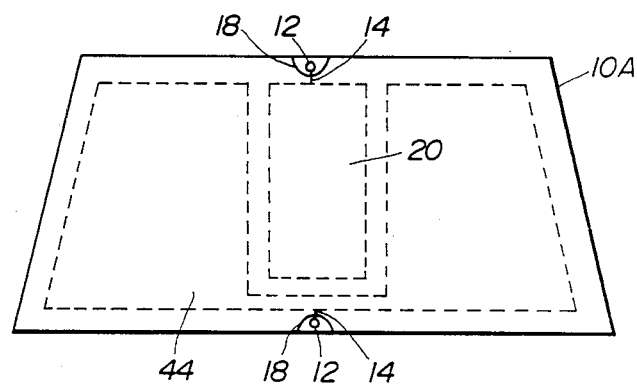
FIG. 12 shows addition of a supplementary transparent film antenna to the film antenna of FIG. 8.

FIG. 12 shows a modification of the auxiliary antennas 40, 40' of FIG. 10. In this case the rectangular center antenna 20 is formed of a heat-reflecting multilayer film comprising a Ag layer and a $TiO_2$ layer, and the same multilayer film is used to provide an auxiliary antenna 44 which occupies relatively wide areas on the lefthand and righthand sides of the antenna 20. Consequently, nearly the entire area of the window pane 10A becomes heat-reflecting. The auxiliary antenna 44 itself can be used as an antenna for reception of FM radio broadcast waves and TV broadcast waves as will be understood from the foregoing description of the auxiliary antennas 40, 40' of FIG. 10. The rectangular center antenna 20 and the auxiliary antenna 44 can be used in combination as a set of diversity antenna for receiving FM radio broadcast waves and TV broadcast waves. Also it is possible to use the auxiliary antenna 44 together with the antenna 20 to receive AM radio broadcast waves.

What is claimed is:

1. A window glass antenna for receiving broadcast waves including FM radio and TV broadcast waves in a vehicle, comprising as a principal element of the antenna a transparent and electrically conductive film attached to a window glass of the vehicle, said electrically conductive film being in the shape of a quadrilateral comprising two substantially parallel sides and two lateral sides, one of said substantially parallel sides being at a distance of 15–25 mm from an upper edge of the window glass and the other of said substantially parallel sides being at a distance of 15–25 mm from a lower edge of the window glass; and further comprising a lead extending from an upper edge of said conductive film to a feed point disposed on the window glass in a horizontally elongate area between the upper edge of the window glass and the upper edge of the conductive film and substantially centrally located between the lateral sides of said quadrilateral.

2. An antenna according to claim 1, wherein the remaining two sides of the quadrilateral film extend generally along two side edges of the window glass, respectively, at a distance of 15-25 mm from respective side edges of the window glass.

3. An antenna according to claim 1, wherein said film is in the shape of a rectangle which is elongate in a direction substantially perpendicular to the upper and lower edges of the window glass and has a lateral width in the range from 50 to 250 mm.

4. An antenna according to claim 3, wherein said film is located in a central area of the window glass.

5. An antenna according to claim 1, wherein said film is coated on a surface of the window glass.

6. An antenna according to claim 1, wherein the window glass is a laminated glass, said film being interposed between two glass sheets of the laminated glass.

7. An antenna according to claim 1, wherein said film is a single-layer film formed of a metal oxide selected from the group consisting of indium-tin-oxide, indium trioxide and tin dioxide.

8. An antenna according to claim 1, wherein said film is a heat-reflecting film.

9. An antenna according to claim 8, wherein said film is a multilayer film comprising a metal oxide selected from the group consisting of $TiO_2$, $BiO_2$ and $ZnO$ and a metal selected from the group consisting of Ag, Au and Cu.

10. A window glass antenna for a vehicle, comprising as a principal element of the antenna a transparent and electrically conductive film attached to and located in a central area of a window glass of the vehicle, said electrically conductive film being in the shape of a rectangle which is elongate in a direction substantially perpendicular to upper and lower edges of the window glass and has a lateral width in the range from 50 to 250 mm, said rectangle comprising two substantially parallel sides, one of said substantially parallel sides being at a distance of 15-25 mm from the upper edge of the window glass and the other of said substantially parallel sides being at a distance of 15-25 mm from the lower edge of the window glass; and further comprising

- a lead extending from an upper edge of said conductive film to a feed point disposed on the window glass in a horizontally elongate area between the upper edge of the window glass and the upper edge of the conductive film, and
- at least one auxiliary antenna element which is a transparent and conductive film attached to the window glass and spaced from said principal element of the antenna.

11. An antenna according to claim 10, wherein said at least one auxiliary antenna element is a heat-reflecting film.

12. An antenna according to claim 11, wherein said principal element of the antenna is a heat-reflecting film.

* * * * *